Patented July 24, 1951

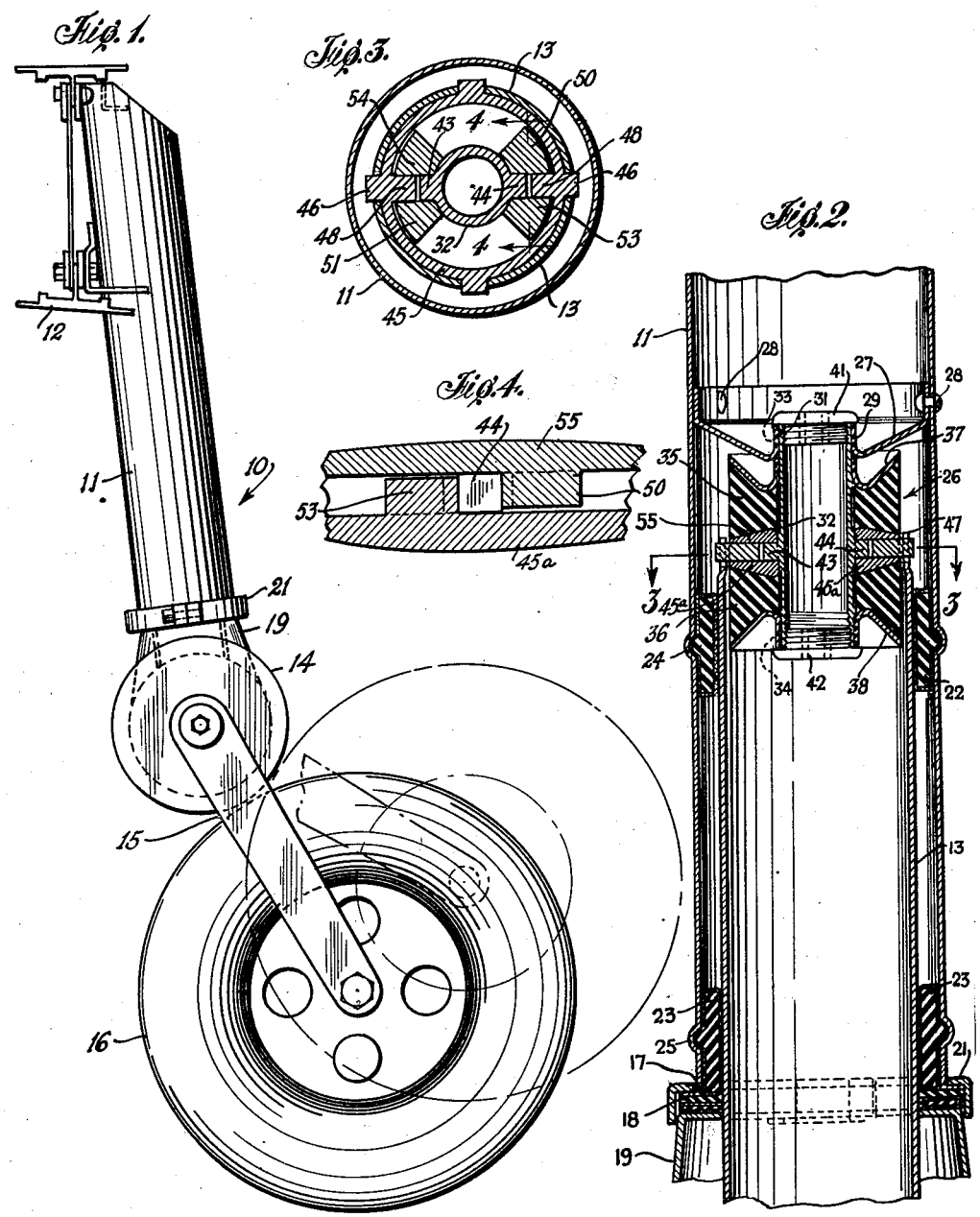

2,562,082

UNITED STATES PATENT OFFICE 2,562,082

CROSS-WIND UNDERCARRIAGE

Roy W. Brown, Akron, Ohio, assignor, by mesne assignments, to the United States of America as represented by the Civil Aeronautics Administration, Department of Commerce Application June 29, 1948, Serial No. 35,781

4 Claims. (Cl. 244—103)

This invention relates to improvements in aircraft undercarriages particularly adapted for cross-wind landings.

While the idea of a cross-wind landing gear for aircraft is old, this type of undercarriage has not been accepted in the past due to certain limitations of an engineering nature. When landing in a direction other than with the wind, an aircraft undercarriage of the cross-wind type must be adapted to permit the aircraft to move on the ground in various angles in respect to the longitudinal axis of the airplane. In other words, an airplane may land in a cross wind with the longitudinal axis thereof at various angles in respect to the line of forward movement of the plane of the airplane at the instant of contact with the ground. It is therefore obvious that at this moment the undercarriage wheels must either be properly aligned in respect to the direction of forward motion, or they must be capable of automatic and substantially immediate alignment therewith.

The general object of the present invention is to provide a novel, improved aircraft undercarriage especially adapted automatically to adjust itself to cross-wind landing conditions.

Another object of the invention is to provide an adjustable support of sturdy design, permitting rotational movement between supported and supporting members.

Another object of the invention is to provide a light, easily assembled cross-wind aircraft undercarriage of a simple design assuring positive action under varying landing and take-off conditions.

Still further object of the invention is to provide an aircraft cross-wind undercarriage torsional bushing for assuring normal alignment of the undercarriage wheels with the aircraft axis.

Other objects of the invention are generally to improve and simplify the design of cross-wind type undercarriage.

In the drawings:

Fig. 1 is an elevational view of an aircraft undercarriage having the principles of the present invention embodied therein.

Fig. 2 illustrates in vertical axial section the inner construction of the support elements of the device of Fig. 1.

Fig. 3 is a horizontal section along line 3—3 of Fig. 2.

Fig. 4 is an enlarged fragmentary detail taken along line 4—4 of Fig. 3.

As best shown in Figs. 1 and 2, an aircraft undercarriage, generically designated 10, includes an elongated cylindrical member 11 adapted to be suitably fixed to the aircraft structure as, for example, by mounting bracket 12. Member 11 is provided with an open lower end for reception and extension within the member of an associated cylindrical member 13 of reduced diameter. The lower end of member 13 carries a unit 14 which in turn provides a pivotal support for a fork arm assembly comprising a pair of radius arms 15 between which a suitable landing wheel 16 is mounted at the lower end thereof. A protective closure member 19 depends from a friction assembly, at the lower end of member 11 to engage unit 14.

To provide means for vertical load transmittal between the support member 11 and the supported member 13, a flange 17 is formed on the lower end of the supported member 11 and is adapted to transmit load to the supported member 13 while permitting rotational movement between members 11 and 13. The load transmitting means may comprise a thrust bearing 18 seated on the upper flanged end of member 19 which is welded or otherwise secured to member 13. A split type retaining clamp 21 encircles flange 17, associated bearing 18, and member 19 to retain the elements in assembly. The telescoped portions of members 11 and 13 are retained in alignment by means of annular bushings 22 and 23 therebetween, the bushings being constrained against axial displacement by engagement with ribs 24 and 25 formed in the supported member 11.

A torsional unit 26 is employed to interconnect members 11 and 13 in a manner to permit relative arcuate movement therebetween under stress but to resist such movement resiliently and to return the members to a predetermined normal no-load position when distorting forces on the undercarriage 10 are removed. Torsion unit 26 is supported at the upper end thereof by a cup 27 secured to member 11 by rivets 28. Cup 27 has an apertured boss 29 with splines 31 formed thereon. Cup 27 provides positioning support for torsion unit 26, a tubular member 32 being splined at each end, as shown at 33, 34 for engagement with splines 31 of boss 29. A pair of elastomer rings 35 and 36 are positioned on tubular member 32 in bonded engagement therewith.

Torsion unit 26 is assembled in a manner to permit each of the elastomer rings 35 and 36 to operate independently in resiliently opposing rotation between members 11 and 13. Elastomer unit 35 is maintained in fixed relation in respect to member 11 by means of its upper dished surface being securely bonded to metallic member 37 which is non-rotatably mounted in respect to a cup-like support element 27. A pair of diametrically disposed lugs 50, 51, Fig. 3, depend from a ring 55 from which said lugs are integrally formed, ring 55 being in turn bonded to the lower dished surface of elastomer ring 35. A companion ring 45a is provided with diametrically disposed lugs 53 and 54, ring 45a being likewise bonded to the upper dished surface of elastomer ring 36 with which it is complementarily engaged as shown in Fig. 2. The upper end of member 13 is provided with circumferentially spaced slots 47 for the reception of radially extending lugs 46, carried by spider 45, a pair of radially inwardly directed lugs 48 being also formed integrally with spider 45 in diametric alignment with lugs 46, with spider 45 floatably positioned between rings 45a and 55.

Referring to Fig. 3, it is seen that with the undercarriage assembly in a normal and unstressed condition, paired lugs 50, 51 and 53, 54 engage both the inwardly directed lugs 48 of spider 45 and the outwardly directed lugs 43, 44 of member 32, with maximum circumferential distance existing between lugs 50 and 54 and 51 and 53. Upon being subjected to displacing stresses, wheel 16 exerts rotational forces on member 13 which are transmitted through spider 45 and either pair of lugs 50, 51 or 53, 54, to one of the elastomer elements 35, 36, causing a wind-up of that member with the member torsionally resisting such movement. For example, if a wheel-transmitted stress causes displacement of spider 45 in a clockwise direction, as viewed in Fig. 3, it is apparent that only diametrically opposed lugs 53 and 54 will be displaced as the result of the rotation of spider 45 in respect to hub element 32, fixed to member 11. Such rotational displacement results in a winding up, under torsional stresses, of elastomer unit 36. It is, of course, obvious that rotational movement of spider 45 in the opposite direction will result in a like winding up of elastomer unit 35 with resistance by that unit to the torsional stresses imparted thereto. Upon release of stresses which cause a wind-up of either elastomer member, the stored energy within that member returns member 13 to its normal position, or at least substantially aids in so doing, the caster action of wheel 16 being effective to maintain normal alignment upon the release of torsional stresses. Because the torsional unit 26 functions solely to oppose relative rotation between undercarriage units 11 and 13, and does not absorb the compressive loads transmitted between members 13 and 11 during landing, the unit 26 need not be of extremely sturdy construction to assure continued safe and positive operation.

The unit as described above may easily be adjusted to present, within reasonable wide ranges, any desired degree of torsional resistance to lateral displacement in either direction. To make such adjustment it is merely necessary, upon assembly of the unit, to introduce a desired degree of pre-wind in each of the elastomer members 35 and 36. This is done by maintaining the diametrically opposed lugs 50, 51 and 53, 54, carried by each elastomer ring as an integral axial extension of the metallic rings bonded thereto, in abutment with the radially inwardly directed lugs 48, and rotating the cup units 37 and 38 respectively, a desired amount prior to slipping said cups under the splined ends of hub unit 32.

What is claimed is:

1. In a device of the character described, the combination comprising a pair of resilient elements centrally apertured and provided at one end thereof with diametrically disposed and axially extending lugs, and a tubular member extending through said element apertures with the lug carrying ends of said elements in abutment with the lugs thereof axially overlapped.

2. In an aircraft undercarriage, a support member, a supported member in telescoped association with said support member, and a resilient connecting member securing said support and supported members together but permitting relative arcuate movement therebetween, said connecting member comprising a tubular member having a pair of diametrically opposed lugs formed on its periphery, said tubular member being secured to said supported member, a pair of elastomer rings telescoped over said tubular member, a metal plate secured to the axially outer faces of each of said rings, means for securing said plates to said supported member, a metal disc secured to the adjacent faces of each of said rings and provided with a pair of substantially diametrically spaced lugs extending axially therefrom, adapted to be positioned immediately adjacent said lugs on said tubular member, and a ring associated with said supported member and provided with a pair of diametrically opposed lugs adapted to be positioned between said lugs on said discs whereby relative movement between said support and supported members occasions torsional movement of said rings.

3. In an undercarriage, a supported member, a support member, means for transmitting load from said supported member to said support member while permitting relative arcuate movement therebetween, a member provided with a pair of diametrically opposed lugs for locking engagement with said supported member, a second member having a pair of diametrically opposed lugs formed thereon and secured to said support member with the lugs of said members disposed in a common plane, torsion rings secured to said supported member, and plate-like metal members secured to said torsional rings, said metal members having axially offset lugs formed thereon for association with the lugs on said first named members.

4. A landing gear having in combination, a cylindrical supporting member, a second cylinder of reduced diameter telescopically associated therewith, an elongated member completely disposed within said first cylinder and partially disposed within said second cylinder, said elongated member being provided with a multiply apertured element extending radially from the axis thereof and providing means for locking said elongated member to said second cylinder in concentric relation thereto, a pair of centrally apertured resilient elements mounted in juxtaposition on said elongated member at opposite sides of said radially extending element, a pair of apertured plates disposed adjacent outer end surfaces of said resilient element in bonded engagement therewith and fixed to said elongated member to prevent rotation therebetween, and lug means carried by said resilient elements to extend axially from the inner end surfaces thereof, and into apertures of said multiply apertured member whereby to provide means for restricting relative rotation between the lug carrying ends of said resilient element and said radially extending element.

ROY W. BROWN.

REFERENCES CITED

The following references are of record in the file of this patent:

FOREIGN PATENTS

| Number | Country | Date |
|--------|---------|------|
| 455,275 | Great Britain | Oct. 12, 1936 |
| 691,789 | Germany | June 5, 1940 |
| 701,969 | France | Jan. 19, 1931 |
| 750,729 | France | May 29, 1933 |
| 789,814 | France | Aug. 26, 1935 |